Figure 1:
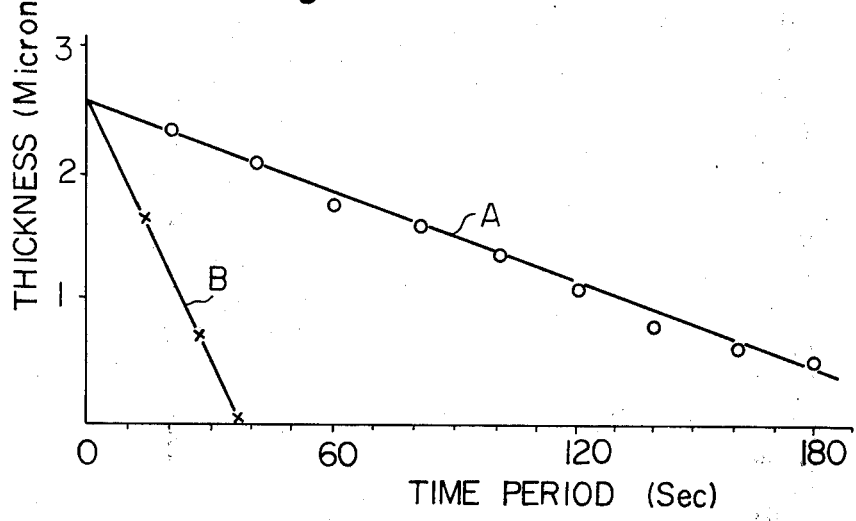

United States Patent [19]

Ogasa et al.

[11] 4,070,522
[45] Jan. 24, 1978

[54] MAGNETIC RECORDING MEDIUM

[75] Inventors: Kazuo Ogasa, Tama; Seiya Ogawa, Yokohama, both of Japan

[73] Assignee: Fujitsu Limited, Japan

[21] Appl. No.: 672,737

[22] Filed: Apr. 1, 1976

Related U.S. Application Data

[63] Continuation-in-part of Ser. No. 462,130, April 18, 1974, abandoned.

[30] Foreign Application Priority Data

Apr. 20, 1973    Japan ................................ 48-44079

[51] Int. Cl.² ............................................. H01F 10/02
[52] U.S. Cl. ............................... 428/336; 252/62.54; 360/134; 428/330; 427/128; 428/328; 428/329; 428/413; 428/539; 428/500; 260/831; 260/834; 260/837 R
[58] Field of Search ............................... 427/127–132; 428/900, 328, 329, 330, 539, 413, 332, 336; 252/62.54; 360/134

[56] References Cited

U.S. PATENT DOCUMENTS

| | | | |
|---|---|---|---|
| 2,941,901 | 6/1960 | Prill et al. ............................ | 428/212 |
| 3,459,698 | 8/1969 | Mantell et al. ....................... | 260/29.4 |
| 3,630,910 | 12/1971 | Akashi et al. ....................... | 252/62.54 |
| 3,687,725 | 8/1972 | Hartmann et al. ................. | 252/62.54 |
| 3,740,266 | 6/1973 | Akashi et al. ....................... | 252/62.54 |
| 3,781,211 | 12/1973 | Lohoff ............................. | 260/37 ED |
| 3,821,025 | 6/1974 | Akashi et al. ....................... | 252/62.54 |

Primary Examiner—George F. Lesmes
Assistant Examiner—Stanley S. Silverman
Attorney, Agent, or Firm—Nelson E. Kimmelman

[57]    ABSTRACT

A magnetic recording medium having finely divided magnetic metal oxide particles dispersed in a thermosetting resin binder and a thickness of no greater than 5 microns is provided. The thermosetting resin binder comprises: (a) 30 to 95 wt.% of a copolymer of 25 to 65 wt.% of alkyl acrylate or alkyl methacrylate, 3 to 30 wt.% of N-methylolacrylamide or N-alkoxymethylacrylamide and 10 to 60 wt.% of styrene or a methyl styrene, (b) 5 to 70 wt.% of an epoxy resin predominantly comprised of a condensation product of bisphenol A and epihalohydrin, and; (c) 0 to 50 wt.% of phenolic resin or amino resin. The magnetic recording medium is superior in abrasion resistance, solvent resistance and dispersion of the magnetic material therein, and possesses improved recording density.

9 Claims, 2 Drawing Figures

MAGNETIC RECORDING MEDIUM

This is a continuation-in-part application of our Ser. No. 462,130, filed Apr. 18, 1974, now abandoned.

This invention relates to a magnetic recording medium having finely divided magnetic metal oxide particles disperesed in a special thermosetting resin binder.

The magnetic recoring medium of the invention is in the form of a thin, coated layer having a thickness of less than 5 microns and which is excellent in abrasion resistance, resistance to solvent and uniformity, i.e., finely divided magnetic materials are uniformly dispersed in the resin binder. Accordingly, the magnetic recording medium is useful for, for example, a magnetic disc device for computers, having improved resolvability.

In general, magnetic recording mediums should have a uniform and satisfactorily reduced thickness and be excellent in adhesion to the substrate. Further, since in a magnetic disc device a magnetic head hydrodynamically floats just above the magnetic disc after the head is once in contact with the disc, the magnetic recording medium in the form of a thin layer should possess increased mechanical strength, such as abrasion resistance, impact resistance and high hardness, and the magnetic head should be capable of readily and stably floating just about the magnetic disc surface. The magnetic recording medium also should have resistance to solvents used for cleaning the magnetic disc.

Some thermosetting resins have been heretofore proposed as a binder for magnetic recording mediums. However, most known binders are not satisfactory because, the resulting magnetic recording medium is generally poor in impact resistance and abrasion resistance, the magnetic material is incapable of being uniformly dispersed in these resins and irregular cloudy patterns appear on the magnetic recording medium surface, although the patterns are faint. These defects become striking, particularly when the magnetic recording medium layer is made thin in order to increase the recording density.

If the kneading of a finely divided magnetic material and a thermosetting resin is performed in a violent manner in the course of the production of a magnetic recording medium, in order to make the dispersion of the finely divided magnetic material more uniform, the finely divided magnetic material usually in the form of needless is liable to be crushed during the kneading. Consequently the magnetic properties of the magnetic material inevitably change and, in particular, the coercive force decreases. Therefore, it is difficult to produce a thin magnetic recording material, having finely divided magnetic material uniformly dispersed therein, with known thermosetting resin binders.

It is an object of the present invention to provide a magnetic recording medium of improved abrasion resistance and solvent resistance.

It is another object of the present invention to provide a magnetic recording medium having finely divided magnetic metal oxide particles uniformly dispersed therein, and exhibiting improved magnetic properties.

Other objects and advantages will be apparent from the following description.

In accordance with the present invention, there is provided a magnetic recording medium comprising finely divided magnetic metal oxide particles dispersed in a thermosetting resin binder, and in the form of a thin film having a thickness of less than 5 microns coated on a nonmagnetic substrate, said thermosetting resin binder comprising:

a. 30% to 95% by weight of a copolymer consisting essentially, based on the weight of the copolymer, of
  1. 25 to 65% by weight of units derived from alkyl acrylate or alkyl methacrylate, the alkyl group having 1 to 4 carbon atoms,
  2. 3 to 30% by weight of units derived from N-methylolacrylamide or N-alkoxymethylacrylamide, the alkoxy group having 1 to 4 carbon atoms,
  3. 10 to 60% by weight of units derived from styrene or a methyl styrene, and,
  4. 0 to 30% by weight of units derived from at least one other copolymerizable ethylenically unsaturated compound, and;

b. 5 to 70% by weight of an epoxy resin, the predominant constituent being a condensation product between bisphenol A and epihalohydrin.

A first component, i.e. component (a), of the thermosetting resin binder composition is a copolymer containing alkyl acrylate or alkyl methacrylate and N-methylolacrylamide or N-alkoxymethylacrylamide. The copolymer consists essentially of 25 to 65% of an alkyl acrylate or alkyl methacrylate, 3 to 30% of N-methylolacrylamide or N-alkoxymethyacrylamide, 10 to 60% of styrene or methyl styrene and, if desired, no greater than 30% of at least one other copolymerizable ethylenically unsaturated compound, all by weight based on the weight of the copolymer. The alkyl acrylate and alkyl methacrylate include those which have alkyl groups with 1 to 4 carbon atoms such as methyl, ethyl, propyl and butyl. When the amount of the alkyl acrylate or methacrylate is outside the above range, the adhesion of the magnetic recording medium to a nonmagnetic substrate is poor. The N-alkoxymethylacrylamide also includes those which have alkoxy groups with 1 to 4 carbon atoms such as methoxy, ethoxy, propoxy and butoxy. The presence of the N-alkoxymethylacrylamide or N-methylolacrylamide in the copolymer improves the dispersibility of the magnetic metal oxide particles in the binder resin. However, when its amount exceeds approximately 30% by weight, the magnetic recording medium becomes brittle.

Styrene or methyl styrene present in the copolymer results in a magnetic recording medium of improved head floating and resistance to solvent such as ethanol. However, when its amount is too large, the adhesion of the medium to a substrate becomes poor. The methyl styrene used includes, for example, vinyl toluene and α-methylstyrene. The copolymer may contain a minor amount of another copolymerizable ethylenically unsaturated compound, for example, acrylonitrile.

These copolymers may be of either random or block form, and are commercially available in the trade name of, for example, "Duracron" Re-1248, RE-1202, RE-377, RE-1101, RE-437, all supplied by Mitsubishi Rayon Co., Japan. These copolymers have a structure such that the main chain has N-methylolamide or N-alkoxymethylamide branches. Accordingly, when these copolymers are cured, crosslinks are formed between the branches.

A second component of the thermosetting resin binder composition is an epoxy resin predominantly comprised of a condensation product prepared by condensation of bisphenol A, i.e., 2,2'-bis(4'hydroxyphenyl)propane, and epihalohydrin, such as epichlorohydrin. The epoxy resin preferably has a molecular weight of approximately 300 to approximately 2,000 and may be those which have been modified by, for example, silicones and alcohols. When the molecular weight of the epoxy resin is in excess of approximately 2,000, the resulting magnetic recording medium is poor in dispersibility of the magnetic metal oxide particles. In contrast, when the molecular weight is lower than approximately 300, the resulting magnetic recording medium is poor in mechanical strengths.

The amounts of the acrylic copolymer and the epoxy resin employed may be varied within the ranges 30 to 95% and 5 to 70%, respectively and preferably, 30 to 70% and 10 to 40%, respectively, all in terms of solid content based on the weight of the thermosetting resin binder composition. When the amount of the acrylic copolymer relative to the amount of the epoxy resin increases, the resulting magnetic recording medium becomes poor in mechanical strengths such as adhesion to substrates, abrasion resistance, impact strength and hardness. In contrast, when the amount of the acrylic copolymer relative to the amount of the epoxy resin decreases, the magnetic recording material becomes poor in dispersibility of the magnetic metal oxide particles in the resulting resin binder composition.

If desired, a suitable amount of a phenolic resin or an amino resin may be incorporated into the thermosetting resin binder composition in order to increase the cross-linking density in the cured resin binder composition, and improve the abrasion resistance, hardness and solvent resistance of the magnetic recording medium.

By the "phenolic resin" used herein, is meant condensation products not only of phenol and formaldehyde, but also of another phenolic compound such as, for example, cresol, xylenol or phenylphenol, and formaldehyde. By the term "amino resin" used herein, is meant condensation products of an amino group-containing compound such as, for example, melamine, guanamine or urea, and formaldehyde. These phenolic and amino resins, which may be employed alone or in combination, should be soluble in a lower alcohol such as n-butanol.

The amount of the phenolic resin and amino resin should be no greater than approximately 50% by weight, in terms of the solid content based on the weight of thermosetting resin binder composition. When the amount of the phenolic resin and the amino resin are in excess of approximately 50% by weight, the resulting magnetic recording medium becomes poor in adhesion to substrates and abrasion strength. The preferable amount is within the range of 10 to 40% by weight.

If desired, a butyral resin which is popularly known as polyvinyl butyral or polyvinyl butyral-acetal may be incorporated into the thermosetting resin binder composition in order to improve further the dispersibility of finely divided magnetic materials in the resin binder composition and provide a magnetic recording medium having an improved smooth and lustrous surface. However, when the amount of the butyral resin is excessive, the magnetic recording medium is poor in mechanical strength. Therefore, the amount of the butyral resin should be no greater than 30% by weight based on the weight of the resin binder composition.

In order to enhance the hardness and solvent resistance of the magnetic recording medium, a minor amount of primary amines or acid anhydrides may be incorporated into the resin binder composition. This is effective particularly for the thermosetting resin binder composition containing a relatively large amount of an epoxy resin. Preferable primary amines are those which have at least two amino moieties, such as, for example, diaminodiphenylmethane of the formula

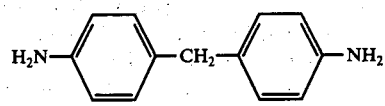

and diaminodiphenylsulfone of the formula

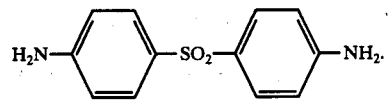

A preferable acid anhydride is for example, hexahydrophethalic acid anhydride.

The amount of primary amines or acid anhydrides should be no greater than approximately 10% by weight based on the weight of the resin binder composition, because, if the amount of these compounds is in excess of the upper limit, the resin binder composition is too rapidly hardened and gels undesirably when cured.

The incorporation of primary amines or acid anhydrides enhances the solvent resistance as set forth above. If desired, additives such as silicon oil may be added.

The finely divided magnetic material to be dispersed in the thermosetting resin binder is not critical. For example, maghemite ($\gamma$-$Fe_2O_3$) and magnetite ($Fe_3O_4$) may be employed.

The method whereby the magnetic recording medium of the invention is prepared is also not critical. Each polymer or resinous component may be blended in the form of a solution dissolved in a suitable solvent or solvents. The blend is kneaded to prepare a uniform dispersion of the magnetic material, and then coated on a non-magnetic substrate such as alumina by a method of, for example, rotation coating, roll coating, doctor knife coating or spray coating. The coated resin layer is heated usually at temperatures of 160° to 230° C to be cured.

Finely divided magnetic metal oxide particles are uniformly dispersed in the thermosetting resin binder composition. Therefore, the time required for kneading the blend of the magnetic material and the resin binder composition can be shortened and the kneading can be performed under mild conditions. This avoids or minimizes the necessity for reduction of the coercive force. The magnetic recording medium of the invention possesses improved abrasion resistance and solvent resistance. Accordingly, it is particularly suitable for a magnetic recording disc device for which a high recording density is required.

In the preparation of the magnetic recording medium of the present invention, it is not necessary to previously treat the magnetic material. This is advantageous in the point that the necessity for reduction of the coercive force is avoidable.

The non-magnetic substrate, on which the dispersion of the magnetic recording material is to be coated, may be a plate of a flat surface composed of a non-magnetic metal or a thermal resistant polymer. The non-magnetic substrate includes, for example, discs of aluminum, an aluminum alloy, polyimide, polyamide-imide or polyester-imide. Particularly, the substrates composed of a thermal resistant polymer are advantageous over those of the metal in that the former usually exhibits larger adhesion to the magnetic recording medium than the latter.

Figure 2:
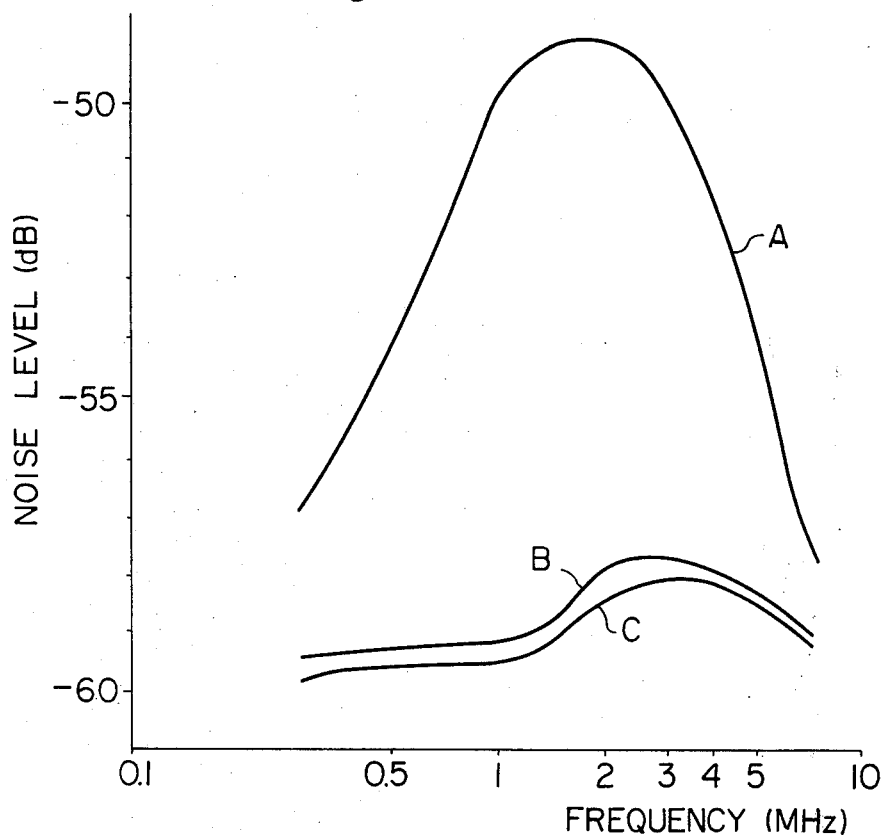

The accompanying drawings in FIGS. 1 and 2 show the characteristics of the magnetic recording medium of the invention and those of a conventional recording medium. These characteristics will be explained in detail by way of the Examples, below.

In the Examples, in which parts and % are by weight, abrasion resistance, solvent resistance, dispersibility of a magnetic material and magnetic characteristics were determined as follows.

a. Abrasion resistance: A kneaded blend of a magnetic material and the resin binder composition was coated on an aluminum disc by a rotation coating method and, then, maintained at a temperature of 220° C for 45 minutes to be cured. The coated layer was ground to reduce the thickness to 1.0 micron by ball milling for three days using a five liter scale pot and alumina balls. A specimen disc of the magnetic recording medium so prepared was rotated at 3,000 rpm; and a head, the head pad portion of which was fitted with a sharp figured alumina splinter, was placed on the rotating specimen in such a manner that the alumina splinter was pressed against the rotating specimen at a load of 1 kg in a position 130 mm distant from the rotation center of the specimen. Abrasion resistance was expressed in terms of the rotation time required for the thickness of the coated layer to be reduced to the prescribed value.

b. Head floating: A test was conducted to determine whether a magnetic head was capable of floating above a rotating disc surface of the magnetic recording medium. The head used was one designed for recording at 4,000 bits per inch and 370 tracks per inch. The coated layer was formed using a spin coating method by the general procedure set forth in the preceding item (a). The thickness of the coated layer was one micron. Results were expressed in four grades as follows.
  A. Head floated at 500 rpm.
  B. Head floated at 1,000 rpm.
  C. Head floated at 3,600 rpm.
  D. Head did not float at 3,600 rpm.

c. Melt adhesion of head: A load of 500 g was applied to a magnetic head, and the specimen disc was rotated at 3,600 rpm. The coated layer was observed to determine whether it was melted and stuck to the head. Results were expressed in four grades as follows.
  A. The head surface was not colored.
  B. The head surface was slightly colored.
  C. Stuck to part of the head surface.
  D. Stuck to the entire head surface.

d. Adhesion of coated layer to substrate: Impact was imparted to the specimen by using a hammer having a semispherical head of 6.4 mm diameter. The specimen was then flexed by using a round bar of 3 mm diameter. Then, the specimen was strongly rubbed with a gauze. Results were expressed in four grades as follows.
  A. The coated layer was not separated.
  B. A minor part of the coated layer in the form of minute particles was separated.
  C. A part of the coated layer in the form of needles was separated.
  D. The coated layer was separated in the form of large scales.

e. Resistance to solvent: A gauze impregnated with solvent was pressed against the specimen disc rotating at 3,600 rpm. It was observed that the gauze was tinged with the color of the specimen disc. Results were expressed in four grades as follows.
  A. The gauze was not tinged.
  B. The gauze was light in color.
  C. The gauze was deep in color.
  D. The coated layer was partially transferred to the gauze and the gauze was deep in color.

f. Dispersibility of magnetic material: Occurrence of pinholes, i.e. minute areas where no $\gamma$-$Fe_2O_3$ particles exist, was observed by an optical microscope of 600 magnifications.

g. Magnetic properties: Coercive force and squareness ratio of the specimen were determined from the magnetization hysteresis loop.

Asterisked Run Nos. in the tables in the Examples are comparative examples.

EXAMPLE 1

| Composition | Content (parts) | Solid content (parts) |
|---|---|---|
| Finely divided magnetic material (needle-like $\gamma$-$Fe_2O_3$ crystal) | 24 | 24 |
| Ethyl acrylate 45%/N-methylolacrylamide 15%/styrene 40% copolymer | 24 | 12 |
| Epikote 1001 (trade name, epoxy resin supplied by Shell Chemical Co., 20% solution in 1:1 mixture of toluene and ethyl cellosolve, MW approximately 1,000) | 30 | 6 |
| Sumilac PC-25 (trade name, phenolformaldehyde resin, supplied by Sumitomo Chemical) | 7 | 3 |
| Silicon oil (KF-69, trade name, supplied by Shinetsu Chemical) | 0.1 | 0.002 |
| Methyl ethyl ketone | 60 | — |
| Diacetone alcohol | 30 | — |
| N-butyl alcohol | 8 | — |
| Toluene | 40 | — |

The finely divided magnetic material was mixed with a mixture of methyl ethyl ketone, diacetone alcohol, n-butyl alcohol and toluene by stirring for 30 minutes. To the dispersion so prepared, the ethyl acrylate/N-methylolacrylamide/styrene copolymer was added, followed by kneading for one hour. Then, the epoxy resin and the phenol resin were added thereto, and kneaded for 15 hours. Finally, the silicone oil was added thereto and kneaded for 30 minutes.

Characteristics of the resulting magnetic recording medium are shown in Table I, below, in comparison with those of a commercially available magnetic recording medium prepared from the following resin binder composition.

| Epikote 1004 (trade name, epoxy resin supplied by Shell Chemical Co.) | 100 | parts |
|---|---|---|
| Melhylon 108 (trade name, phenol resin supplied by General Electric) | 55 | " |
| Poly (vinyl methyl ether) (plasticizer) | 28 | " |
| Silicon resin | 2.7 | " |
| Hexahydrophthalic anhydride | 8 | " |

Table I

| Run No. | 1 | 2* |
|---|---|---|
| Dispersibility of $\gamma$-Fe$_2$O$_3$ | No pinhole was observed. Lustrous | Many pinholes were observed. Some were 10 microns in size |
| Abrasion resistance | Graph A in FIG. 1 | Graph B in FIG. 1 |
| Solvent resistance — Methyl ethyl ketone | Excellent | Fairly good |
| Solvent resistance — Toluene | Excellent | Good |
| Coercive force Hc (Oe) | 320 | 270 – 300 |
| Squareness ratio Br/Bs | 0.60 | 0.55 |

Note:
Abrasion resistance was tested on the coated layer of 2.5 micron thickness at the alumina head load of 350 g.

EXAMPLE 2

Using copolymers A, B and C, described below the three epoxy resins described below and finely divided magnetic material (needle-like $\gamma$-Fe$_2$O$_3$), magnetic recording mediums having the composition shown in Tables II and III, below, were prepared following the general procedure set forth in Example 1. The ratio by weight of $\gamma$-Fe$_2$O$_3$ to the resin binder composition was 55/45.

| | |
|---|---|
| Copolymer A: | N-methylolacrylamide 15%/ethyl acrylate 45%/styrene 40%. |
| Copolymer B: | Butanol-etherified N-methylolamide of acrylic acid 15%/ethyl acrylate 45%/styrene 40%. |
| Copolymer C: | Butanol-etherified N-methylolamide of acrylic acid 15%/ethyl acrylate 40%/styrene 40%/acrylic acid 5%. |
| Epikote 828: | a condensation product of bisphenol A and epichlorohydrin supplied by Shell Chemical Co., MW = approximately 350 |
| Allyl glycidyl ether: | $CH_2=CH-CH_2-OCH_2CH-CH_2$, MW = 114. $\diagdown O \diagup$ |
| Epikote 1001: | a condensation product of bisphenol A and epichlorohydrin supplied by Shell Chemical Co., MW = approximately 1,000. |

Characteristics of the magnetic recording mediums are shown in Tables II and III.

Table II

| Run No. | Acrylic copolymer (%) A | Acrylic copolymer (%) B | Epoxy resin (%) 828 | Epoxy resin (%) AGE | Head floating | Melt adhesion of head | Adhesion of coated layer to substrate | Resistance to ethanol |
|---|---|---|---|---|---|---|---|---|
| 1* | 100 | | 0 | | C | D | C | D |
| 2 | 90 | | 10 | | A | A | B | A |
| 3 | 80 | | 20 | | A | A | A | A |
| 4 | 70 | | 30 | | A | A | A | A |
| 5* | | 100 | 0 | | C | D | D | D |
| 6* | | 90 | 10 | | A | D | D | D |
| 7* | | 80 | 20 | | A | D | D | D |
| 8* | | 70 | 30 | | A | D | D | D |
| 9* | 100 | | | 0 | C | D | C | D |
| 10* | 90 | | | 10 | C | C | D | D |
| 11* | 80 | | | 20 | C | C | D | D |
| 12* | 70 | | | 30 | C | C | D | D |
| 13* | | 100 | | 0 | C | D | D | D |
| 14* | | 90 | | 10 | C | D | D | D |
| 15* | | 80 | | 20 | C | C | D | D |
| 16* | | 70 | | 30 | C | C | D | D |

Note:
Epoxy resin, 828 = Epikote 828, AGE = Allyl glycidyl ether

Table III

| Run No. | Acrylic copolymer (%) A | Acrylic copolymer (%) B | Acrylic copolymer (%) C | Epoxy resin (%) 828 | Epoxy resin (%) AGE | Epoxy resin (%) 1001 | Time period (sec) 0.8 μ thick | Time period (sec) 0.5 μ thick | Time period (sec) 0.2 μ thick |
|---|---|---|---|---|---|---|---|---|---|
| 1* | 100 | | | 0 | | | 11 | 26 | 41 |
| 2 | 90 | | | 10 | | | 40 | 96 | 150 |
| 5* | | 100 | | 0 | | | 9 | 21 | 33 |
| 6* | | 90 | | 10 | | | 6 | 16 | 24 |
| 10* | 90 | | | | 10 | | 7 | 16 | 26 |
| 14* | | 90 | | | 10 | | 10 | 23 | 37 |
| 17 | 90 | | | | | 10 | 45 | 111 | 176 |
| 18* | | | 90 | | | 10 | 4 | 10 | 17 |

Notes:
(1) Epoxy resin, 1001 = Epikote 1001
(2) Abrasion resistance was expressed in terms of the time required for the magnetic recording medium layer of 1.0 μ thickness to be reduced to the prescribed thickness.

Dispersibility of $\gamma$-Fe$_2$O$_3$ particles in the magnetic recording medium was tested by observing the occurrence of pinholes, i.e. minute areas where no $\gamma$-Fe$_3$O$_3$ particles exist, by using an optical microscope of 400 magnifications. No pinholes were found on specimens of Run No. 1, 2 and 17, but many pinholes were found on specimens of Run No. 5 and 18.

EXAMPLE 3

Following the general procedure set forth in Example 1, magnetic recording mediums having the following composition were prepared wherein various acrylic copolymers containing, as the alkyl acrylate or methacrylate component, ethyl acrylate, butyl acrylate, 2-ethylhexyl acrylate, methyl methacrylate or butyl acrylate were used.

| | |
|---|---|
| Finely divided γ-Fe₂O₃ | 55% |
| Acrylic copolymer (N-methylolacrylamide 15%/ alkyl acrylate or methacrylate 45%/styrene 40%) | Varied |
| Epoxy resin, Epikote 1001 | Varied |

The abrasion resistance and other characteristics of the magnetic recording mediums were tested. Results are shown in Tables IV and V.

Table IV

Abrasion resistance
(Acrylic copolymer/epoxy resin = 80/20 by weight)

| Run No. | Alkyl acrylate or methacrylate | 0.8 μ thick | 0.5 μ thick | 0.2 μ thick |
|---|---|---|---|---|
| 1 | Ethyl acrylate | 45 | 110 | 174 |
| 2 | Butyl acrylate | 49 | 120 | 188 |
| 3* | 2-Ethylhexyl acrylate | 27 | 43 | 64 |
| 4 | Methyl methacrylate | 38 | 95 | 147 |
| 5 | Butyl methacrylate | 35 | 84 | 133 |
| 6 | — | 11 | 23 | 34 |

Note:
Run No. 6 indicates a specimen prepared by using a resin binder composition containing no acrylic copolymer.

Table V

| Run No. | Alkyl acrylate or methacrylate | Ratio of acrylic copolymer/epoxy resin (by wt.) | Head floating | Melt adhesion of head | Adhesion of coated layer to substrate | Resistance to ethanol |
|---|---|---|---|---|---|---|
| 7* | Ethyl acrylate | 100/0 | B | C | C | C |
| 8 | " | 90/10 | A | A | A | A |
| 1 | " | 80/20 | A | A | A | A |
| 9 | " | 70/30 | A | A | A | A |
| 10* | Butyl acrylate | 100/0 | C | D | B | D |
| 11 | " | 90/10 | B | B | A | A |
| 2 | " | 80/20 | A | A | A | A |
| 12 | " | 70/30 | A | A | A | A |
| 13* | 2-Ethylhexyl acrylate | 100/0 | D | D | D | D |
| 14* | " | 90/10 | C | C | B | C |
| 3* | " | 80/20 | B | B | B | B |
| 15* | " | 70/30 | B | B | A | B |
| 16* | Methyl methacrylate | 100/0 | B | C | D | C |
| 17 | " | 90/10 | A | A | B | A |
| 4 | " | 80/20 | A | A | A | A |
| 18 | " | 70/30 | A | A | A | A |
| 19* | Butyl methacrylate | 100/0 | C | C | D | C |
| 20 | " | 90/10 | B | A | A | A |
| 5 | " | 80/20 | A | A | A | A |
| 21 | " | 70/30 | A | A | A | A |

Further, adhesion of the coated layer to the alumina substrate was tested on specimens prepared by using acrylic copolymers having the compositions shown in Table VI.

Table VI

Adhesion of coated layer to substrate
(Acrylic copolymer/epoxy resin = 80/20 by weight)

| Run No. | Alkyl acrylate or methacrylate | MAA | AA(MA) | Styrene | Adhesion of coated layer to substrate |
|---|---|---|---|---|---|
| 22* | Ethyl acrylate | 15 | 10 | 75 | B |
| 23* | " | 15 | 20 | 65 | A |
| 24 | " | 15 | 30 | 55 | A |
| 1 | " | 15 | 45 | 40 | A |
| 25 | " | 15 | 60 | 25 | A |
| 26* | " | 10 | 70 | 20 | B |
| 27* | " | 10 | 80 | 10 | B |
| 28* | " | 10 | 90 | 0 | C |
| 29* | Methyl methacrylate | 15 | 10 | 75 | B |
| 30* | " | 15 | 20 | 65 | B |
| 31 | " | 15 | 30 | 55 | A |
| 4 | " | 15 | 45 | 40 | A |
| 32 | " | 15 | 60 | 25 | A |
| 33* | " | 10 | 70 | 20 | B |
| 34* | " | 10 | 80 | 10 | C |
| 35* | " | 10 | 90 | 0 | D |

Note:
MAA = N-methylolacrylamide
AA(MA) = Alkyl acrylate or methacrylate

EXAMPLE 4

Following the general procedure set forth in Example 1, magnetic recording mediums having the following composition were prepared.

| | |
|---|---|
| Finely divided γ-Fe₂O₃ (width = 300 angstrom; length/width = about 10) | 55% |
| Acrylic copolymer | 36% |
| Epoxy resin, Epikote 1001 | 9% |

Occurrence of pinholes, i.e. minute areas where no γ-Fe₂O₃ particles exist, was observed by an optical microscope of 600 magnifications. When the amount of N-methylolacrylamide in the copolymer was 1 and 2%, more than 10 pinholes and several pinholes were found, respectively, per unit area of 1mm × 1mm. However, when the amount of N-methylolacrylamide was 3% or more, no pinholes were found.

The dependence of the residual noise level of the magnetic recording mediums upon the frequency was determined as follows. Results are shown in FIG. 2, in which curve A indicates a specimen prepared by using a commercially available binder composition comprised of 70% of Epikote 1007 and 30% of phenolformaldehyde resin (Sumilac PC25, supplied by Sumitomo Chemical), and curves B and C indicate specimens prepared by using resinous binder compositions containing acrylic copolymers comprised of 45% of ethyl acrylate, 40% of styrene and 15% of N-methylolacrylamide (curve C) or N-butoxymethylacrylamide (curve B).

The degree of orientation of the magnetic material, defined by the squareness ratio (Br/Bs), was determined at a magnetic field intensity of 1,000 Oe on the specimens shown by curve C and curve A in FIG. 2. The specimens of curves C and A exhibited Br/Bs of 0.92 and 0.78, respectively.

The above results show that the magnetic recording medium of the invention possesses improved dispersibility of the magnetic material and therefore exhibits reduced residual noise and an improved degree of orientation.

MS-11, supplied by Sanwa Chemical) were prepared and their solvent resistance and head floating were tested. Results are shown in Table IX.

Table IX

| Run No. | Binder composition (%) | | | Content of $\gamma$-Fe$_2$O$_3$ (%) | Resistance to ethanol | Head floating |
|---|---|---|---|---|---|---|
| | Acrylic copolymer | Epoxy resin | Melamine resin | | | |
| 1 | 80 | 20 | 0 | 50 | A | A |
| 2 | 80 | 20 | 0 | 60 | B | B |
| 3 | 80 | 20 | 0 | 70 | D | C |
| 4 | 60 | 20 | 20 | 50 | A | A |
| 5 | 60 | 20 | 20 | 60 | A | A |
| 6 | 60 | 20 | 20 | 70 | C | C |
| 7 | 40 | 20 | 40 | 50 | A | A |
| 8 | 40 | 20 | 40 | 60 | A | A |
| 9 | 40 | 20 | 40 | 70 | B | B |
| 10 | 30 | 20 | 50 | 50 | A | A |
| 11 | 30 | 20 | 50 | 60 | A | A |
| 12 | 30 | 20 | 50 | 70 | A | A |

When the content of $\gamma$-Fe$_2$O$_3$ is large, both solvent resistance and head floating increase with an increase in the amount of the melamine-formaldehyde resin. However, it was found that the incorporation of the melamine-formaldehyde resin in an amount larger than approximately 50% reduces the adhesion of the coated layer to substrates and makes the coated layer brittle.

The above procedure was repeated wherein the following resins were separately used instead of the melamine-formaldehyde resin. The results were approximately similar to the above. Melamine-formaldehyde resin (M86, supplied by Ciba-Geigy), Guanamine-formaldehyde resin (Nikalac BL-60, supplied by Sanwa Chemical), butylated resol-formaldehyde resin (Sumilac PC-25, supplied by Sumitomo Bakelite; Super Bechacite, supplied by Nihon Reichhold; Hitanol 4010, supplied by Hitachi Manufacturing), butylated urea-formaldehyde resin (Bechamine P-138, supplied by Nihon Reichhold; Melane, supplied by Hitachi Manufacturing.).

EXAMPLE 5

Following the general procedure set forth in Example 1, magnetic recording mediums having the composition shown in Example 4 were prepared wherein various acrylic copolymers were employed. Their head floating and resistance to solvent were as shown in Table VII.

Table VII

| Run No. | Acrylic copolymer | | | Head floating | Resistance to ethanol |
|---|---|---|---|---|---|
| | EA(%) | MAA(%) | Styrene(%) | | |
| 1* | 85 | 15 | 0 | C | C |
| 2* | 75 | 15 | 10 | B | B |
| 3 | 65 | 15 | 20 | A | A |
| 4 | 55 | 15 | 30 | A | A |
| 5 | 45 | 15 | 40 | A | A |
| 6 | 35 | 15 | 50 | A | A |
| 7 | 25 | 15 | 60 | A | A |

EXAMPLE 6

Following the general procedure set forth in Example 1, magnetic recording mediums were prepared wherein the proportion of Epikote 1001 to the acrylic copolymer was varied as shown in Table VIII, below. Characteristics of the magnetic recording mediums are shown in Table VIII.

Table VIII

| Run No. | Ratio of epoxy resin acrylic copolymer | Resistance to ethanol | Adhesion of coated layer to substrate | Occurrence of Pinholes | Square ratio (Br/Bs) |
|---|---|---|---|---|---|
| 1* | 0/100 | C | C | Not observed | About 0.9 |
| 2 | 10/90 | A | A | " | " |
| 3 | 20/80 | A | A | " | " |
| 4 | 40/60 | A | A | " | " |
| 5 | 60/40 | A | A | " | " |
| 6 | 70/30 | B | A | " | " |
| 7* | 80/20 | C | B | Slightly observed | About 0.8 |

EXAMPLE 7

Following the general procedure set forth in Example 1, magnetic recording mediums containing an alcohol-modified melamine-formaldehyde resin (Nikalac

EXAMPLE 8

| Composition | Content (parts) | Solid content (parts) |
|---|---|---|
| Finely divided needle-like $\gamma$-Fe$_2$O$_3$ crystal | 24 | 24 |
| Butyl acrylate 50%/N-methylolacrylamide 15%/styrene 35% copolymer | 24 | 12 |
| Epikote 1001 (20% solution in 1:1 mixture of toluene and ethyl cellosolve) | 30 | 6 |
| Nikalack BL-60 (melamine-formaldehyde resin supplied by Sanwa Chemical) | 5 | 3 |
| Silicon oil | 0.1 | 0.002 |
| Methyl ethyl ketone | 60 | — |
| Diacetone alcohol | 30 | — |
| N-butyl alcohol | 8 | — |
| Toluene | 40 | — |

From the above composition, a dispersion of the magnetic material was prepared as follows. The finely divided magnetic material was mixed with the mixture of the solvents by stirring for 30 minutes. To the dispersion so prepared, the butyl acrylate copolymer was added followed by kneading for one hour. Then the Epikote 1001 and Nikalack BL-60 were added thereto, and kneaded for 15 hours. Finally, the silicone oil KF-69 was added thereto and kneaded for 30 minutes. A magnetic recording medium prepared from the thus obtained dispersion exhibited characteristics similar to those in Example 1 except that it was superior in softness and flexibility.

EXAMPLE 9

| Composition | Content (parts) | Solid content (parts) |
|---|---|---|
| Finely divided needle-like γ-Fe$_2$O$_3$ crystal | 24 | 24 |
| Ethyl acrylate 45%/N-methylolacrylamide 15%/styrene 30% copolymer | 30 | 15 |
| Epikote 1001 | 30 | 6 |
| Silicon oil | 0.1 | 0.002 |
| Methyl ethyl ketone | 60 | — |
| Diacetone alcohol 13 | 30 | — |
| N-butyl alcohol | 8 | — |
| Toluene | 40 | — |

From the above composition, a dispersion of the magnetic material was prepared as follows. The finely divided magnetic material was mixed with the mixture of the solvents by stirring for 30 minutes. To the dispersion so prepared, the ethyl acrylate copolymer was added followed by kneading for one hour. Then, the Epikote 1001 was added thereto, and kneaded for 15 hours. Finally, the silicon oil KF-69 was added thereto and kneaded for 30 minutes. A magnetic recording medium was prepared from the thus obtained dispersion and was tested. The magnetic recording medium exhibited characteristics similar to those in Examples 1 and 8 except that it was slightly inferior in abrasion resistance and solvent resistance.

EXAMPLE 10

Following the procedure set forth in Example 1, a magnetic recording medium was prepared wherein an ethyl acrylate 45%/N-methoxymethylacrylamide 15%/styrene 40% copolymer was used in substitution for the ethyl acrylate/N-methylolacrylamide/styrene copolymer. The test results were similar to those in Example 1.

EXAMPLE 11

Following the procedure set forth in Example 1, a magnetic recording medium was prepared wherein a methyl methacrylate 50%/N-methylolacrylamide 15%/styrene 35% copolymer was used in substitution for the ethyl acrylate/N-methylolacrylamide/styrene copolymer. The magnetic recording medium exhibited characteristics similar to those in Example 1 except that it was slightly inferior in flexibility but superior in resistance to chemicals.

EXAMPLE 12

Following the procedure set forth in Example 1, a magnetic recording medium was prepared wherein an ethyl acrylate 60%/N-methylolacrylamide 20%/styrene 20% copolymer was used. The magnetic recording medium exhibited characteristics similar to those of Example 1, except that it was slightly harder.

EXAMPLE 13

| Composition | Content (parts) | Solid content (parts) |
|---|---|---|
| Finely divided needle-like γ-Fe$_2$O$_3$ crystal | 24 | 24 |
| Methyl methacrylate 55%/N-methylolacrylamide 25%/styrene 20% copolymer | 24 | 12 |
| Epikote 1001 | 30 | 6 |
| Phenol-formaldehyde resin "BKR 2620" | 6 | 3 |
| (supplied by UCC, 50% solution in n-butyl alcohol) Silicon oil | 0.1 | 0.002 |
| Methyl ethyl ketone | 60 | — |
| Diacetone alcohol | 30 | — |
| N-butyl aochol | 8 | — |
| Toluene | 40 | — |

From the above composition, a dispersion of the magnetic material was prepared as follows. The finely divided magnetic material was mixed with a mixture of the solvents by stirring for 30 minutes. To the dispersion so prepared, the ethyl acrylate copolymer was added, followed by kneading for one hour. Then, the Epikote 1001 and the phenol-formaldehyde resin "BKR 2620" were added thereto, and kneaded for 15 hours. Finally, the silicon oil KF-69 was added thereto and kneaded for 30 minutes.

The magnetic recording medium made from the dispersion so prepared was found to possess characteristics similar to those in Example 1, except that it was harder and slightly brittle.

EXAMPLE 14

Following the procedure set forth in Example 1, three magnetic recording mediums were prepared wherein a polyvinyl butyral-acetal resin having a degree of butyral of 63 mole % and an average polymerization degree of approximately 500 was used in an amount of 5, 15 and 30% by weight, respectively, based on the total solid content of the thermosetting resin specified in Example 1, in addition to the thermosetting resin composition specified in Example 1; and the polyvinyl butyral-acetal resin was mixed at first with the magnetic recording material and a mixture of the solvents, and then mixed with the other resin components.

The three magnetic recording mediums were found to have the magnetic recording material more uniformly dispersed in the resin binder composition and each component of the resin binder composition had improved affinity with each other, as compared with the magnetic recording medium of Example 1. Further, the magnetic recording medium was flexible although only to a slight degree, and no pinholes and irregular cloudy patterns appeared therein.

EXAMPLE 15

Following the procedure set forth in Example 1, a dispersion of the magnetic recording material was prepared wherein 5% of diamino diphenylmethane was used in substitution for the phenolic resins. The dispersion had a tendency to become slightly viscous with the lapse of time. The magnetic recording medium prepared from the dispersion was found to possess characteristics similar to those in Example 1.

What we claim is:

1. A magnetic recording medium comprising finely divided magnetic metal oxide particles dispersed in a thermosetting resin binder composition and in the form of a thin layer film having a thickness of less than 5 microns closely adhered to a non-magnetic substrate, said thermosetting resin binder composition comprising:

a. 30% to 95% by weight of a copolymer consisting essentially, based on the weight of the copolymer, of
   1. 25% to 65% by weight of units derived from at least one compound selected from the group consisting of alkyl acrylate and alkyl methacrylate, the alkyl group having 1 to 4 carbon atoms,
   2. 3% to 30% by weight of units derived from at least one compound selected from the group consisting of N-methylolacrylamide and N-alkoxymethylacrylamide, the alkoxy group having 1 to 4 carbon atoms,
   3. 10% to 60% by weight of units derived from at least one compound selected from styrene and methyl styrenes, and,
   4. 0% to 30% by weight of units derived from at least one other copolymerizable ethylenically unsaturated compound, and;
b. 5% to 70% by weight of an epoxy resin, the predominant constituent being a condensation product of bisphenol A and epihalohydrin, possessing an average molecular weight of approximately 300 to approximately 2,000.

2. A magnetic recording medium according to claim 1 wherein the amount of said copolymer is 30 to 70% by weight based on the weight of the thermosetting resin binder composition.

3. A magnetic recording medium according to claim 1 wherein the amount of said epoxy resin is 10 to 40% by weight based on the weight of the thermosetting resin binder composition.

4. A magnetic recording medium according to claim 1 wherein said thermosetting resin binder composition further comprises less than 50% by weight of at least one resin selected from the group consisting of a phenolformaldehyde resin and an amino resin.

5. A magnetic recording medium according to claim 4 wherein the amount of said resin is 10 to 40% by weight based on the weight of said thermosetting resin binder composition.

6. A magnetic recording medium according to claim 4 wherein said amino resin is at least one resin selected from the group consisting of a urea-formaldehyde resin and a melamine-formaldehyde resin.

7. A magnetic recording medium according to claim 1 wherein said thermosetting resin binder composition further comprises less than 30% by weight, based on the weight of said thermosetting resin binder composition, of at least one compound selected from the group consisting of polyvinyl butyral and polyvinyl butyralacetal.

8. A magnetic recording medium according to claim 1 wherein said thermosetting resin binder composition further comprises no greater than 10% by weight, based on the weight of the thermosetting resin binder composition, of at least one compound selected from the group consisting of primary amines and acid anhydrides.

9. A magnetic recording device having the magnetic recording medium defined in claim 1.

* * * * *